(12) United States Patent  (10) Patent No.: US 6,472,615 B1
Carlson                       (45) Date of Patent:    Oct. 29, 2002

(54) BULK FLOW MEASUREMENT SYSTEM

(75) Inventor: Brent T. Carlson, Bloomington, MN (US)

(73) Assignee: Gustafson, LLC, Plano, TX (US)

( * ) Notice: Subject to any disclaimer, the term of this patent is extended or adjusted under 35 U.S.C. 154(b) by 40 days.

(21) Appl. No.: 09/658,216

(22) Filed: Sep. 8, 2000

(51) Int. Cl.[7] .......................... G01G 17/04; G01G 11/00
(52) U.S. Cl. .......................... 177/16; 177/60; 177/116; 177/119; 177/105; 222/77; 222/564
(58) Field of Search .................. 177/60, 116, 119, 177/16, 105; 222/56, 71, 77, 564; 141/83

(56) References Cited

U.S. PATENT DOCUMENTS

| | | | |
|---|---|---|---|
| 504,125 A | 8/1893 | Dougan | 222/55 |
| 558,900 A | 4/1896 | Dougan | 241/34 |
| 771,598 A | 10/1904 | Baker | 222/55 |
| 932,944 A | 8/1909 | Baker | 222/55 |
| 2,100,315 A | 11/1937 | Harper | 222/55 |
| 2,872,073 A | 2/1959 | Harper | 222/55 |
| 4,165,975 A * | 8/1979 | Kwiatkowski et al. | 177/16 |
| 4,354,622 A | 10/1982 | Wood | 222/55 |
| 4,660,665 A | 4/1987 | Powell, Jr. | 177/145 |
| 4,688,610 A * | 8/1987 | Campbell | 141/83 |
| 4,729,442 A | 3/1988 | Sichet | 177/50 |
| 4,944,428 A * | 7/1990 | Gmür et al. | 222/55 |
| 5,002,140 A * | 3/1991 | Neumüller | 177/16 |
| 5,024,352 A * | 6/1991 | Gmür et al. | 177/50 |
| 5,054,652 A | 10/1991 | Oshima et al. | 222/1 |
| 5,125,535 A | 6/1992 | Ohlman | 222/77 |
| 5,148,841 A * | 9/1992 | Graffin | 141/83 |
| 5,219,031 A | 6/1993 | Brandt, Jr. | 222/77 |
| 5,230,251 A | 7/1993 | Brandt, Jr. | 73/861.72 |
| 5,409,020 A * | 4/1995 | Belvederi | 177/119 |
| 5,411,171 A * | 5/1995 | Quirling et al. | 222/56 |
| 5,622,250 A * | 4/1997 | Johanson | 177/105 |
| 5,637,836 A * | 6/1997 | Nakagawa et al. | 177/105 |
| 5,670,751 A * | 9/1997 | Häfner | 177/60 |
| 5,834,707 A * | 11/1998 | Wirth | 177/16 |
| 5,945,638 A | 8/1999 | Maddocks | 177/16 |
| 5,957,331 A * | 9/1999 | Minor | 222/56 |

* cited by examiner

*Primary Examiner*—Randy W. Gibson
(74) *Attorney, Agent, or Firm*—Patterson, Thuente, Skaar & Christensen

(57) ABSTRACT

A grain flow measuring system for a flow rate of grain moving along a grain flow path. The grain flow measuring system includes a frame, a load cell, a flow conditioning portion, and a flow measuring portion. The frame is mounted with respect to the grain flow path. The load cell is mounted to the frame. The flow conditioning portion is attached to the frame. The flow conditioning portion has a first baffle located along the grain flow path. The flow measuring portion has a second baffle and a third baffle that are located in series along the grain flow path. The second baffle and the third baffle deflect grain moving along the grain flow path and thereby causes the flow measuring portion to engage the load cell.

20 Claims, 3 Drawing Sheets

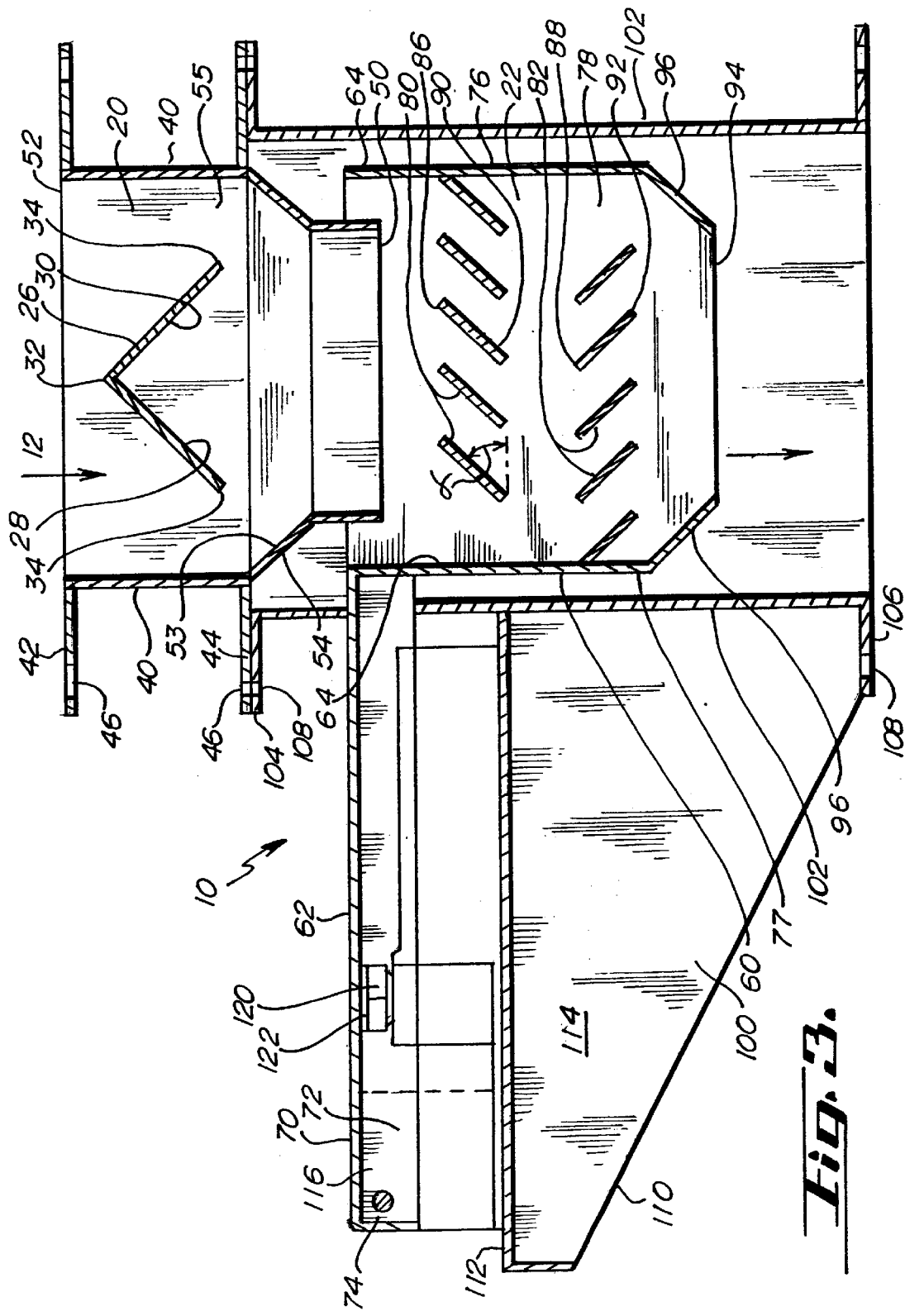

BULK FLOW MEASUREMENT SYSTEM

BACKGROUND OF THE INVENTION

The present invention relates generally to a bulk materials measurement system. More particularly, specific embodiments of the present invention relate to an in-line grain flow measurement device that may be used to control subsequent processing.

In connection with the sale and transfer of products it is often important to accurately measure the amount of the product being sold and transferred. Accurate measurement of products being sold enables a company that manufactured the product to be adequately compensated for their efforts in manufacturing the product. Similarly, accurate measurement of products being transferred enables the transferor to be adequately compensated for the effort associated with transferring the products. Moreover, accurate measurement of product during the transfer of product allows subsequent processing, such a treatment with chemicals to be optimally performed; that is, precise amounts of materials for maximum effectiveness and minimal exposure.

Accordingly, large amounts of products are shipped in bulk such as by placing in a hopper-style railroad car or in a barge. While these shipping methods enable large amounts of product to be transferred, problems are often encountered when the product is transferred to an end user to ensure that the end user obtains a specified amount of product.

To make processing most expedient the weighing, particularly in the context of process controlling, should be done on the material as it is moving. This allows adjustment of operational parameters on a real time or slightly delayed time frame for downstream processes.

Various techniques have been developed to measure the flow of bulk materials. Dougan, U.S. Pat. No. 504,125 and 558,900, each disclose systems for automatically controlling the flow of grain. The Dougan devices each have a plurality of angularly oriented baffles that are aligned perpendicular to the flow of grain. When the force exerted upon the baffles by the grain exceeds a desired level, a gate is activated to slow the flow of grain.

Baker, U.S. Pat. Nos. 771,598 and 932,944, each disclose controlling the flow of grain by allowing the grain to strike a series of angularly oriented plates. As the flow of grain exceeds a specified level, the force of the grain upon the angularly oriented plates causes a door through which the grain passes to be progressively closed.

Harper, U.S. Pat. No. 2,40,315, and Sichet, U.S. Pat. No. 4,729,442, each disclose measuring the flow rate of grain moving along a conveyor. Harper, U.S. Pat. No. 2,872,073, describes a system for measuring and controlling the flow of material from a hopper. The system includes a set of angularly oriented baffles that are aligned horizontally and perpendicular to the flow of material from the hopper. Grain striking the baffles causes the set of baffles to be deflected horizontally and perpendicular to the flow of grain from the hopper and so indicate the material flow rate. When the grain flow rate exceeds a specified level, the baffles engage a piston that is operably connected to a valve that reduces flow of material from the hopper.

Wood, U.S. Pat. No. 4,354,622, discloses a flow control system for controlling and measuring the rate at which material flows from a hopper. A gate valve is provided at a lower end of the hopper to control the flow of material from the hopper. A single angled impact plate is positioned below the hopper so that material passing through the gate valve deflects the impact plate and thereby causes a force that is indicative of the flow rate to be registered by a transducer.

Ohlman, U.S. Pat. No. 5,125,535, discloses measuring the flow of material from a hopper by depositing material upon a rotating disk. A portion of the disk is supported by a scale. Weight of the material on the scale is measured to determine the material flow rate.

Brandt, Jr., U.S. Pat. Nos. 5,230,251 and 5,219,031, each disclose measuring the flow rate of falling objects using an arcuate surface. The arcuate surface causes the downward force to be transformed into horizontal force.

All of the above patents are incorporated herein by reference.

SUMMARY OF THE INVENTION

In a preferred embodiment of the invention, a bulk material flow measuring and processing system measures a flow rate for material such as grain along a flow path and provides a control signal based on said flow for controlling a downstream process such as an herbicide applicator. In a preferred embodiment the system includes a grain measuring system, a control portion, a process portion, and a grain conveyance system. The grain measuring system includes a frame, a flow conditioning portion, and a flow measuring portion. The flow measuring portion has a baffle array attached to a lever arm that actuates a load cell upon deflection of the lever arm. The flow conditioning portion has two sets of static deflectors that change the direction of flow twice above the flow measuring portion. The flow conditioning portion is attached to the frame and absorbs the kinetic energy and any pressure head from the grain flow. The conditioning portion may also function as and include a regulating portion that limits the maximum grain flow rate. This may be provided by the limited area between the static deflectors. The output of the load cell may be connected to a control processor that provides a control signal to a process portion that may, for example, control a pump flow rate or a valve to vary the amount of herbicide injected in a seed coating apparatus.

A feature and advantage of the invention is that flow of grain in a diverse range of flow rates may be measured.

A further feature and advantage of the invention is that the flow conditioning is done statically with no moving parts. Moreover, said conditioning is mechanically simple and provides flow rate control as well as controlling the kinematic energy of the falling grain, as well as any pressure associated with a head, that is, the potential energy of a stream of bulk material.

A further feature and advantage of the invention is that the measurement mechanism is mechanically simple and reliable. Moreover the mechanism portion, that is the pivot points and bearings are physically displaced from the flow of the bulk material. This provides a high level of reliability and lessens maintenance. Moreover, the configuration provides a labyrinth seal between the bulk material flow path and the exterior of the system. Although such seal is not air tight it provides excellent containment of the bulk material flow while still providing sufficient freedom of movement of the mechanisms for accurate and reliable operation.

A further feature and advantage of the invention is that the minimal vertical displacement between the conditioning portion and the measurement portion effectively eliminates kinematic and potential energy considerations of the bulk material flow being measured.

A further feature and advantage of the invention is that the flow rate regulation on the bulk material flow is optimally minimal and functions at only an upper limit. Moreover said regulation is done statically with no moving parts.

BRIEF DESCRIPTION OF THE DRAWINGS

FIG. 4 is a top view of a flow conditioning portion of the grain flow measuring system of FIGS. 2 and 3.

FIG. 5 is a top view of a flow measuring portion of the grain flow measuring system.

DETAILED DESCRIPTION OF THE PREFERRED EMBODIMENTS

Figure 1:
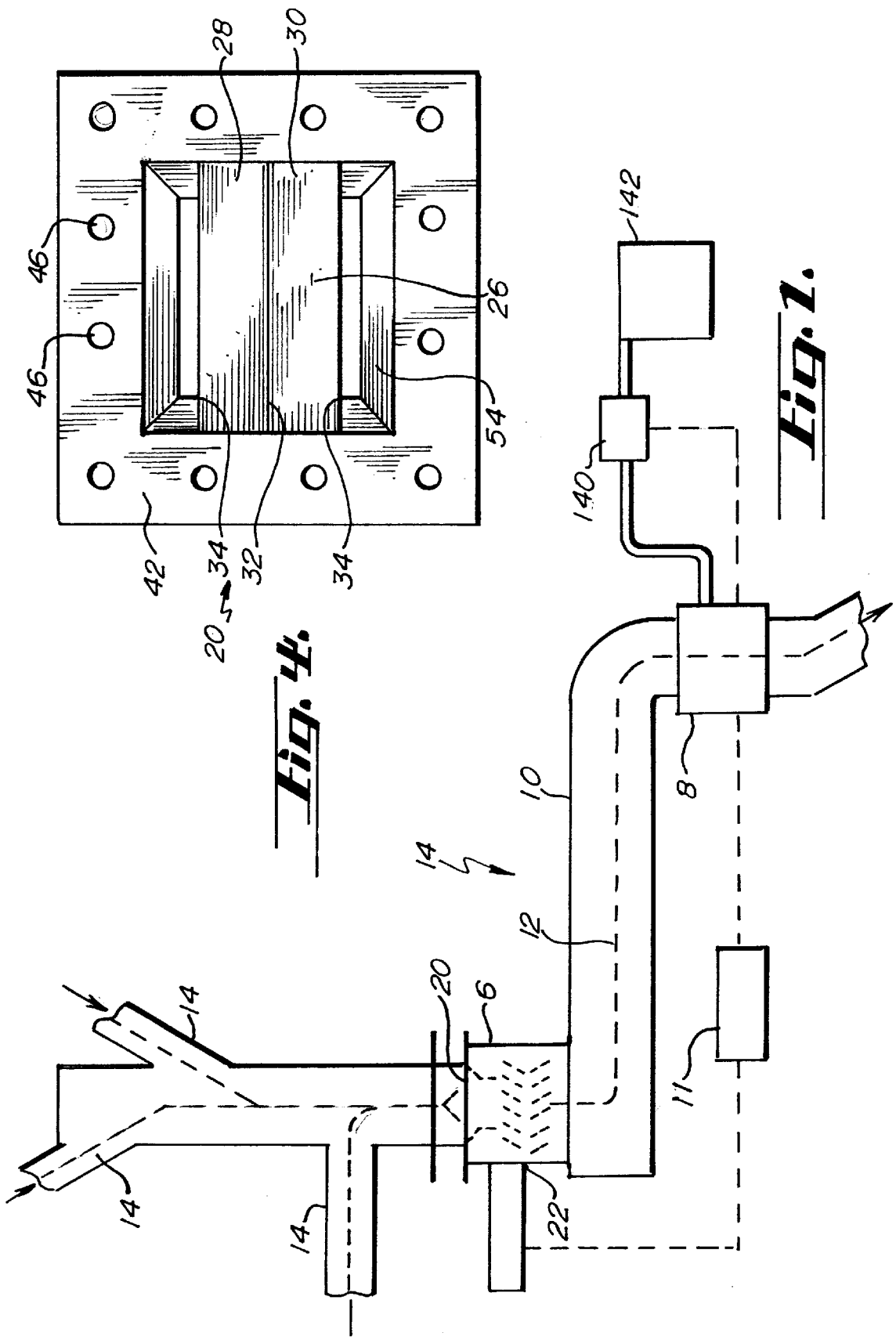
FIG. 1 is a schematic view of a measuring and process system in accordance with the invention.
Figure 2:
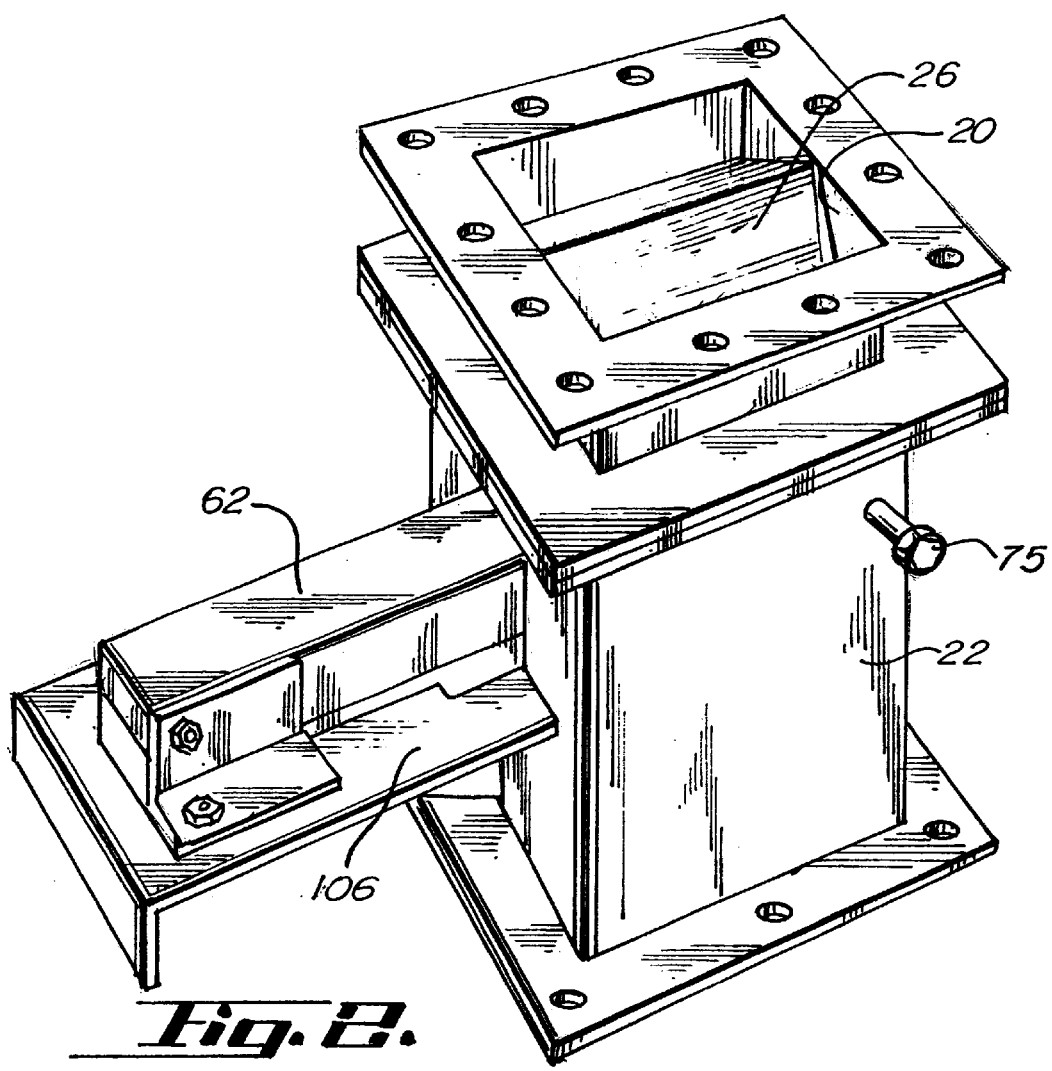
FIG. 2 is a perspective view of a grain flow measuring system in accordance with the invention herein.

Referring to FIG. 1 a preferred embodiment of the invention is illustrated and comprises a flow measurement and processing system generally identified with the numeral 4. Such a system is ideally suited for measuring and controlling the processing of grain or other materials but it is apparent the systems and components are suitable for measuring the flow of and controlling the processing of other bulk materials. Where "grain" is utilized in the specification herein, it is to be understood that bulk materials may be substituted therefore.

The system 4 as illustrated comprises a bulk flow measuring system 6 configured, a processing portion 8, a conveyance system 10, and a control system 11 operatively connecting the measuring system 6 and the processing portion 8. The grain flow measuring system 4 enables the rate of grain flow to be accurately measured. The grain flow measurements are used for providing data or for process control and are described in detail below. The processing portion 8 is controllable equipment providing a process to the grain such as an applicator, for example, for herbicides, or a grain dryer.

The grain flow measuring and processing system 4 is placed in a flow path 12 of the conveyance system 10. Said conveyance system 10 may be comprised of augers, conveyor belts, gravity operated slides, chutes or other conveyance equipment. The grain flow measuring and processing system 4 permits the rate of grain flow to be measured with minimal interference with the flow of grain. Preferably, the grain flow measuring and processing system 4 is used with a vertically descending grain flow. As illustrated in FIG. 1, multiple feed sources 14 may be provided. The conditioning portion facilitates such multiple feed sources 14 by reducing the kinetic energy associated with faster falling grain from the more vertically displaced grain sources effectively equalizing the velocity of the grain when it impacts the baffle array of the measurement system 6. The control system 11 may be a conventional microprocessor control unit as is well known in the art. The control system 11 is connected to the measurement system 6 and is programmed to vary a process parameter in accordance with the measured flow rate. One such process parameter may be pump speed or valve opening for process portions such as herbicide applicators. For dryers, the process parameter could be the amount of natural gas.

The grain flow measuring system 6 includes a flow conditioning portion 20 and a flow measuring portion 22. The flow conditioning portion 20 is located in the grain flow path 12 upstream from the flow measuring portion 22. These portions 20, 22 are vertically displaced by perhaps 0.5 to 1.5 feet to minimize the effects of the flow stream pressure head and kinetic energy.

The flow conditioning portion 20 has a first deflector or baffle 26 that substantially extends across a width of the flow conditioning portion 20, as most clearly illustrated in FIGS. 2–5. The first baffle 26 includes a first baffle section 28 and a second baffle section 30 that are preferably oriented substantially perpendicular to each other with a point 32 where the first baffle section 28 and the second baffle section 30 intersect upstream in the flow path 12 from ends 34 of the first baffle section 28 and the second baffle section 30 that are opposite the intersection point 32.

The flow conditioning portion 20 preferably has a substantially square profile with each side 40 having an approximately equal length. Preferably the length of each side 40 is about 6 inches. The flow conditioning portion 20 preferably includes an upper flange 42 and a lower flange 44 for attaching the flow conditioning portion 20 to the flow measuring portion 22 and the other components in the grain flow measuring system 4. Each of the flanges 42, 44 has at least one aperture 46, 48 formed therein that is adapted to receive bolts (not shown) for attaching the components.

To facilitate transfer of grain between the flow conditioning portion 20 and the flow measuring portion 22, a downstream end 50 of the flow conditioning portion 20 preferably has a width that is smaller than a width of an upstream end 52 of the flow conditioning portion 20. The flow conditioning portion 20 preferably includes a second deflector 53 configured as a tapered region 54 intermediate the upstream end 52 and the downstream end 50. The region 55 between the first deflector and the second deflector provides grain flow level regulation. The area limits the quantity of grain that can pass through.

The flow measuring portion 22 includes a bowl 60 and an lever arm 62 extending from the bowl 60. The bowl 60 preferably has a substantially square profile with sides 64. The sides 64 preferably have lengths approximately equal to the lengths of the sides 40.

The lever arm 62 preferably has a C-shaped configuration with top sections 70 and side sections 72. The C-shaped configuration enhances the structural rigidity of the arm 62. Opposite the bowl 60, a pivot point defined by a suitable pin or axle 74 extends through the side sections 72. Centering members 75, ideally formed of low friction material such as high density polyethylene, may be adjustable by way of threads.

Figure 3:
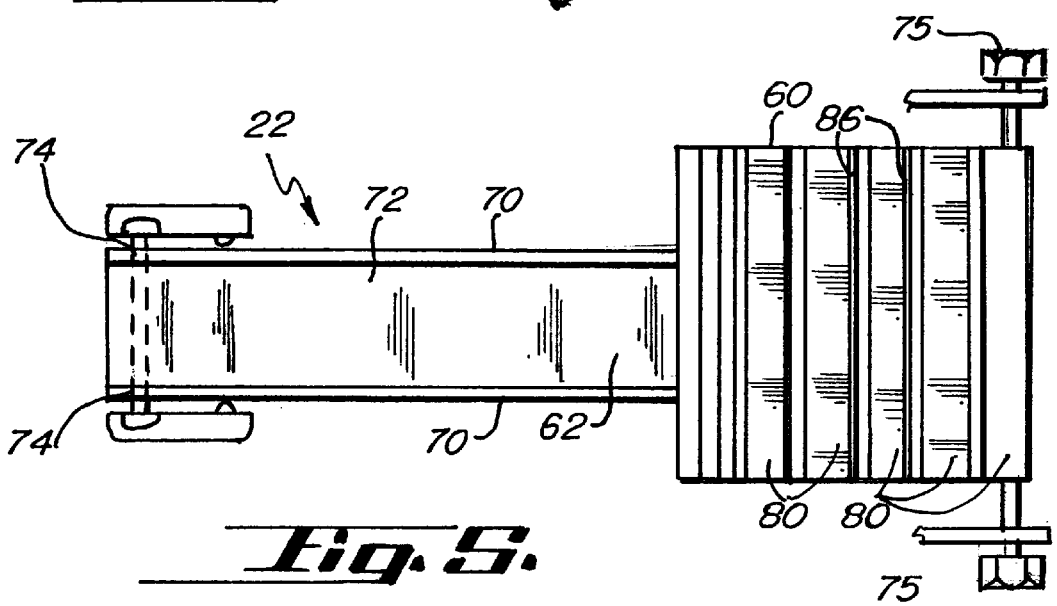
FIG. 3 is a sectional view of a grain flow measuring system of the present invention.

The flow measuring portion 22 has a baffle array 77 that includes second baffle set 76 and third baffle set 78 that are attached to the bowl 60, as most clearly illustrated in FIG. 3. The second baffle set 76 and the third baffle set 78 are both positioned in the grain flow path so that the third baffle set 78 is downstream from the second baffle set 76.

The second baffle set 76 includes a plurality of second baffle elements 80 that are aligned perpendicular to the flow path 12. There are preferably 5 third baffle elements 82 in the third baffle 78. The third baffle elements 82 each preferably have a length of approximately 1 inch or greater.

The third baffle set 78 includes a plurality of third baffle elements 82 that are aligned perpendicular to the flow path 12.

Each of the second baffle elements 80 are preferably oriented parallel to each other. Similarly, each of the third baffle elements 82 are preferably oriented parallel to each other. The second baffle elements 80 are preferably perpendicular to the third baffle elements 82. The second baffle elements 80 are oriented at an angle α of between about 30 and 60 degrees and preferably about 45 degrees.

The second baffle elements 80 are preferably offset from the third baffle elements 82 so that a leading edge 86 of the second baffle elements 80 is aligned substantially above a leading edge 88 of the third baffle elements 82. The offset positioning of the second and third baffle elements 80, 82 causes a significant portion of the grain to strike at least one of the second and third baffle elements 80, 82 and thereby enhances the accuracy of the grain flow measuring process.

A distance between the lower edge 50 of the flow conditioning portion 20 and the leading edge 86 of the second baffle elements 80 is at least as large as a vertical height of the second baffle elements 80. Preferably, the distance between the lower edge 50 of the flow, conditioning portion 20 and the leading edge 86 of the second baffle elements 80 is between one and two times as large as the vertical height of the second baffle elements 80.

A distance between a lower edge 90 of the second baffle elements 80 and leading edge 88 of the third baffle elements 82 is at least as large as a vertical height of the second baffle elements 80. Preferably, the distance between the lower edge 90 of the second baffle elements 80 and the leading edge 88 of the third baffle elements 82 is between one and two times as large as the vertical height of the second baffle elements 80.

A distance between a lower edge 92 of the third baffle elements 82 and a lower edge 94 of the bowl 60 is at least as large as a vertical height of the second baffle elements 80. Preferably, the distance between the lower edge 92 of the third baffle elements 82 and the lower edge 94 of the bowl 60 is between one and two times as large as the vertical height of the second baffle elements 80.

Opposite the grain regulator portion 20, the bowl 60 has an inwardly tapered region 96. The inwardly tapered region 96 facilitates transfer of grain from the flow measuring portion 22 to other portions of the grain moving system.

The grain flow measuring system 4 further includes a frame 98. The frame 98 extends around at least a section of the flow measuring portion 22. The frame 98 thereby prevents the escape of grain form the grain flow measuring system 4. The frame 98 has a square profile with sides 99 that are longer than the sides 64. The frame 98 has an upper flange 100 and a lower flange 102 for attaching the frame 98 to other parts of the grain flow system. To facilitate connections of the frame 98 to other components, the flanges 100, 102 each include a plurality of apertures 104, 105 that are adapted to receive bolts (not shown).

Extending from the frame 98 is an arm 106. The arm 106 has a top portion 112 and a side portion 114 that are preferably oriented substantially perpendicular to each other in the shape of the letter T.

A plate 116 is attached to the top portion 112. The plate 116 has an aperture (not shown) extending therethrough. Extending a bolt through the apertures 102 and the plate aperture (not shown) enables the flow measuring portion 22 to be pivotally mounted to the plate 116.

A load cell 120 is attached to the top portion 112 so that a load sensing plate 122 engages the top section 70. The load cell 120 may be operably connected to the process controller and/or a display device (not shown) that is capable of displaying the grain flow rate.

The components of the grain flow measuring system 4 are preferably fabricated from steel. However, a person of ordinary skill in the art will appreciate that the grain flow measuring system 4 may be fabricated from other types of metallic or plastic materials. Selection of the types of materials, the thickness of the materials, and the dimensions of the grain flow measuring system is based upon the intended material flow rates and the type of material whose flow rate is being measured.

While the present invention has been described in conjunction with measuring the flow of grain, a person of ordinary skill in the art will appreciate that the flow rate measuring concepts of the present invention may be readily adapted for use with measuring the flow rates of other materials.

In operation, grain enters the grain flow measuring and processing system 4 along flow path 12. The flow may be through one or several flow ducts (feed sources) 14. The grain first enters the flow conditioning portion 20 of the measurement system 6 where the grain strikes the first deflector 26 and then is deflected against the sides 40. The first deflector 26 and the sides 40 absorb a significant portion of the kinetic energy of the grain as well as any head pressure. Moreover, the restrictive area of the tapered region 54 limits the amount of grain that may flow therethrough to the flow measuring portion 22.

The grain moves along the flow path 12 and enters the flow measuring portion 22. The grain strikes the second baffle elements 80, which causes the grain to be deflected. The grain then strikes the third baffle elements 82, which causes the grain to. be again deflected. Thereafter, the grain continues the flow through the grain moving system.

The force of the grain striking the second and third baffle elements 80, 82 causes the bowl 60 to be deflected downwardly. The downward movement of the bowl 60 causes the arm 62 to pivot as indicated by arrow 130. Pivoting of the arm 62 urges the arm 62 away from the load sensing plate 122 that causes the load cell 120 to report a flow rate to the control processor and/or display device. Since the grain continues to flow through the grain flow measuring system 4, the grain flow measuring system 4 provides real-time data as to the grain flow rate to accurately determine the amount of grain being transferred. The control processor is configured to control one or more operational parameters of the process portion. For a herbicide applicator, such parameter may be the pump speed of pump 140 which connects to herbicide source 142.

It is contemplated that features disclosed in this application, as well as those described in the above applications incorporated by reference, can be mixed and matched to suit particular circumstances. Various other modifications and changes will be apparent to those of ordinary skill.

What is claimed is:

1. A grain flow measuring system for measuring a flow rate of grain moving along a grain flow path, the grain flow measuring system comprising:
   a frame mounted with respect to the grain flow path;
   a load cell mounted to the frame;
   a flow conditioning portion attached to the frame, the flow conditioning portion comprising a first baffle located along the grain flow path; and
   a flow measuring portion having a second baffle and a third baffle that are located in series along the grain flow path, wherein grain moving along the grain flow path deflects the second baffle and the third baffle so that the flow measuring portion engages the load cell.

2. The grain flow measuring system of claim 1, wherein the second baffle comprises a plurality of second baffle elements. wherein the third baffle comprises a plurality of third baffle elements.

3. The grain flow measuring system of claim 2, wherein the plurality of second baffle elements are each oriented substantially parallel to each other, and wherein the plurality of third baffle elements are each oriented substantially parallel to each other.

4. The grain flow measuring system of claim 2, wherein the plurality of second baffle elements are oriented substantially perpendicular to the plurality of third baffle elements.

5. The grain flow measuring system of claim 1, wherein the flow measuring portion is pivotally mounted to the frame.

6. The grain flow measuring system of claim 5, wherein the load cell is positioned intermediate to the second baffle and a point at which the flow measuring portion is pivotally mounted to the frame.

7. The grain flow measuring system of claim 1, wherein the flow measuring portion includes a bowl and a lever arm extending from the bowl.

8. The grain flow measuring system of claim 7, wherein the load cell engages the flow measuring portion through the lever arm.

9. The grain flow measuring system of claim 7, wherein the second baffle and the third baffle are located in the bowl.

10. The grain flow measuring system of claim 1, wherein the first baffle includes a first section and a second section that are oriented substantially perpendicular to each other.

11. The grain flow measuring system of claim 10, wherein a point where the first baffle section and the second baffle section intersect is upstream in the flow path from ends of the first baffle section and the second baffle section.

12. A method of measuring the flow of grain that is moving along a grain flow path, the method comprising:

substantially absorbing a portion of the kinetic energy of the flow of grain along the grain flow path with a first baffle positioned along the grain flow path;

restricting the grain flow to a maximum level;

contacting the flow of grain to a baffle array located in series along the grain flow path, the baffle array connecting to a lever arm; and determining a force associated with the grain contacting the baffle array by measuring the deflection of the lever arm.

13. The method of claim 12, further comprising the step of controlling an operational parameter of a process portion downstream from the baffle array.

14. The method of claim 12, the baffle array comprising a second baffle and a third baffle, wherein the second baffle and the third baffle are each mounted in a flow measuring portion pivotally mounted to a frame, and wherein contacting the flow of grain to the second baffle and the third baffle causes the flow measuring portion to pivot with respect to the frame.

15. The method of claim 14, wherein pivoting the flow measuring portion with respect to the frame causes the flow measuring portion to engage a load cell.

16. The method of claim 15, wherein the load cell is located intermediate the second baffle and a point at which the flow measuring portion is pivotally mounted to the frame.

17. The method of claim 12, wherein the baffle array has a plurality of second baffle elements and a plurality of third baffle elements.

18. The method of claim 17, wherein the plurality of second baffle elements are oriented substantially perpendicular to the third plurality of baffle elements.

19. The method of claim 12, wherein the first baffle includes a first baffle section and a second baffle section that are mounted substantially perpendicular to each other, and wherein a point where the first baffle section and the second baffle section intersect is upstream in the flow path from ends of the first baffle section and the second baffle section.

20. The method of claim 12, wherein measuring of the force is performed by a load cell.

* * * * *